United States Patent [19]
Waters

[11] 4,321,981
[45] Mar. 30, 1982

[54] COMBINATION SHEAR WAVE AND COMPRESSIONAL WAVE SEISMIC ENERGY VIBRATOR

[75] Inventor: Kenneth H. Waters, Oakland, Calif.

[73] Assignee: Conoco, Inc., Ponca City, Okla.

[21] Appl. No.: 120,502

[22] Filed: Feb. 11, 1980

[51] Int. Cl.³ ................ G01V 1/133; G01V 1/143
[52] U.S. Cl. .................................. 181/119; 181/114; 367/189; 367/75
[58] Field of Search .................. 367/75, 189, 190; 181/113, 114, 119, 121

[56] References Cited
U.S. PATENT DOCUMENTS

| | | | |
|---|---|---|---|
| 3,244,252 | 4/1966 | Burns | 181/121 |
| 3,860,087 | 1/1975 | Silverman | 181/119 |
| 3,934,673 | 1/1976 | Silverman | 181/121 |
| 4,026,383 | 5/1977 | Bedenbender et al. | 181/121 |
| 4,059,820 | 11/1977 | Turpening | 181/113 |
| 4,143,736 | 3/1979 | Fair | 367/75 |
| 4,222,454 | 9/1980 | Airhart | 181/121 |

*Primary Examiner*—Howard A. Birmiel
*Attorney, Agent, or Firm*—William J. Miller

[57] ABSTRACT

A combination of fixed geometry of vibrating masses on a baseplate coupled to the ground, the masses being at a fixed angle to each other and of relatively variable phase, can be controlled to produce both compressional and shear waves simultaneously in a seismic exploration system.

14 Claims, 5 Drawing Figures

U.S. Patent  Mar. 30, 1982  Sheet 1 of 2  4,321,981
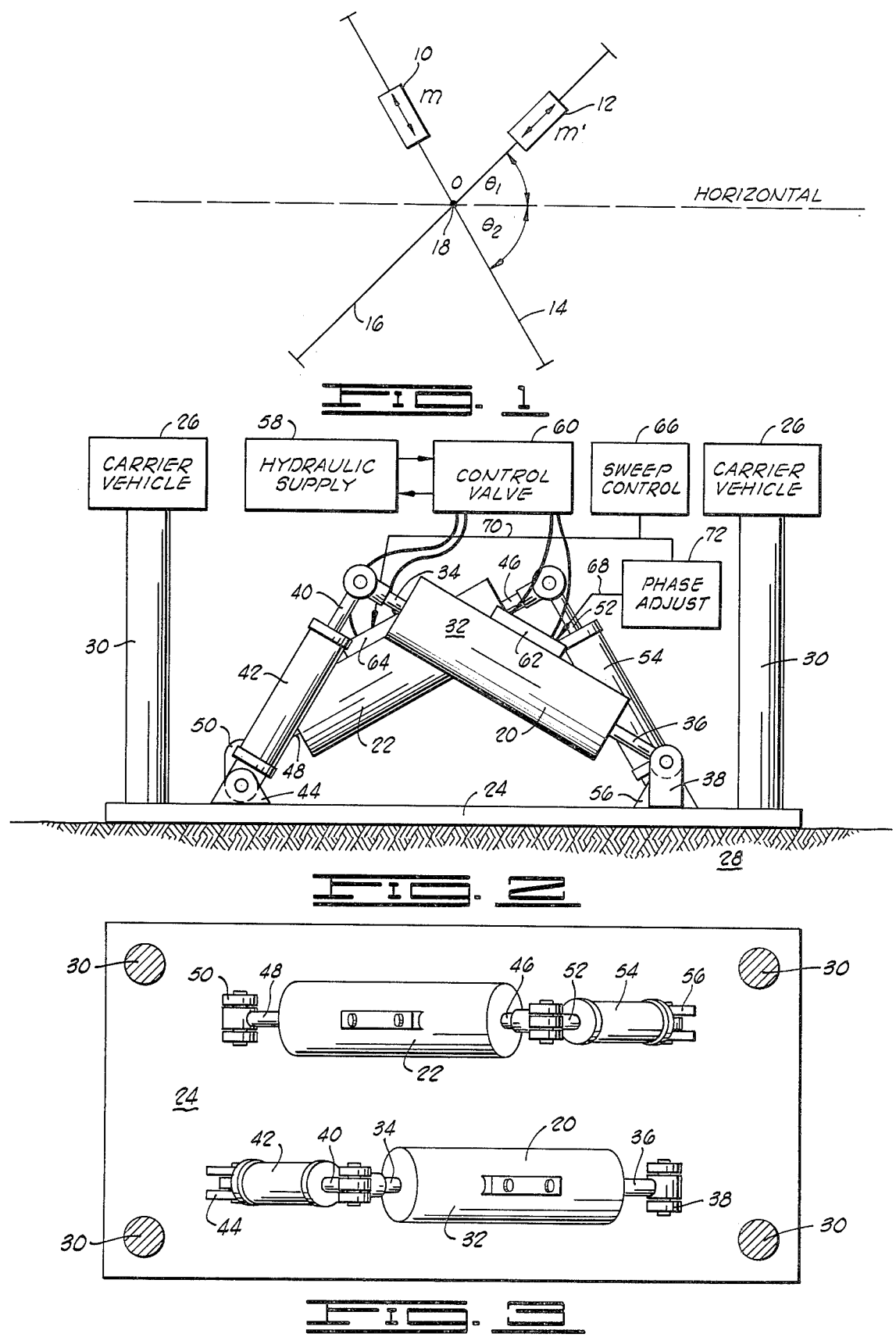

4,321,981

COMBINATION SHEAR WAVE AND COMPRESSIONAL WAVE SEISMIC ENERGY VIBRATOR

BACKGROUND OF THE INVENTION

1. Field of the Invention

The invention relates generally to seismic energy vibrators and, more particularly, but not by way of limitation, it relates to an improved form of vibration apparatus wherein selected combinations of compressional and shear wave energy are generated simultaneously for input to the earth.

2. Description of the Prior Art

Any such form of purposefully generating simultaneously both compressional and shear wave energy for seismic exploration purposes has not been known heretofore. Successive generations of shear waves and compressional waves from the same source point with reception of received reflection data, correlation and processing comparison for purposes of determining shear/compressional velocity differences was taught in U.S. Pat. No. 3,302,164 in the name of the present inventor as entitled "METHOD AND APPARATUS FOR GEOPHYSICAL PROSPECTING WHICH UTILIZES BOTH REFLECTED SHEAR AND PRESSURE WAVES". Individual teachings of shear wave vibrators and compressional wave vibrators functioning singularly are taught by respective U.S. Pat. Nos. 3,159,233 and 3,306,391, as owned by the present assignee, but none of these prior teachings contemplate or even approach the present method and apparatus which allows simultaneous generation at the same surface source point of both compressional and shear seismic waves.

SUMMARY OF THE INVENTION

The present invention contemplates a combination of fixed geometry of vibrating masses operating at a fixed angle to each other, the phase of the two masses relative to each other being variable through conventional vibrator servo control to effect desired inputs of compressional and shear waves simultaneously. In a more limited aspect, the invention consists of a conventional vibrator frame assembly, as it may be truck mounted for operational mobility, and which includes a base plate having variably orientable hydraulic vibrators mounted thereon. Each vibrator assembly may consist of a pivot affixure to the base plate with its opposite side being angularly variable by a hydraulic cylinder, such vibrator assemblies being transversely oppositely disposed on the base plate.

Therefore, it is an object of the present invention to provide a seismic energy vibrator that is capable of generating shear and compressional wave inputs to the earth simultaneously.

It is also an object of the invention to provide such apparatus that is easily controllable as to angular reciprocation such that any selected combination of shear and compressional wave earth input may be effected with complementary correlation processing of respective received energy components.

It is still another object of the invention to provide the combination shear and compressional wave energy vibrator which in effect places a Rayleigh wave input to the earth's surface, such detected Rayleigh waves being effective for use in cancelling interference for the particular source and receiver points.

Finally, an object of the present invention is to provide a combination shear/compressional wave seismic vibrator and mobile assembly having greater efficiency of usage.

Other objects and advantages of the invention will be evident from the following detailed description when read in conjunction with the accompanying drawings which illustrate the invention.

BRIEF DESCRIPTION OF THE DRAWINGS

FIG. 1 is a schematic representation of vibrator mass function in accordance with the present invention;

FIG. 2 is a simplified elevational view of a shear/compressional vibrator with associated equipment shown in block form;

FIG. 3 is a top plan view of the combination vibrator shown in FIG. 2;

DETAILED DESCRIPTION OF THE INVENTION

Figure 4:
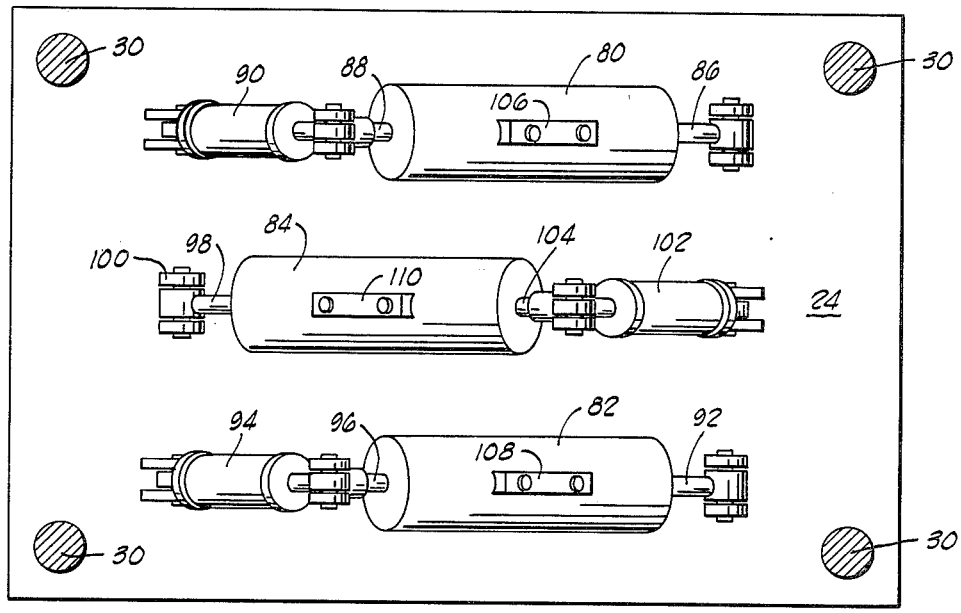
FIG. 4 is a top plan view of an alternative form of combination vibrator that may be constructed in accordance with the present invention.

In seismic exploration, it is possible to derive information about the earth layering by both compressional (P) waves and by horizontally polarized (SH) shear waves. The different types of waves are responsive to different elastic modulii of the earth and, hence, they tend to complement each other in information indication. For example, the ratio of transverse contraction to longitudinal extension of selected subsurface strata, i. e., Poisson's ratio, may be derived from the ratio of P wave velocity to SH wave velocity, and may provide valuable information as to substratum rock type and presence of fracturing. The aforementioned U.S. Pat. No. 3,302,164 in the name of the present inventor teaches in considerable detail the values of combined compressional and shear wave seismic prospecting, albeit a simultaneous source was not then envisioned.

The different types of seismic waves may be detected at earth's surface independently by using vertically polarized geophones to detect the P waves and horizontally polarized geophones to detect the shear waves. Thus, by generating the P and SH waves simultaneously, it renders much greater efficiency of operation to simultaneously detect both types of reflected waves at the designated geophone pattern. In such pattern, the vertical geophones and horizontal geophones may be placed in juxtaposition at each receiver point with subsequent recording and correlation of all vertically polarized seismic waves separate from the horizontally polarized seismic waves.

As illustrated in FIG. 1, the invention depends upon using the combination of fixed geometry vibrating masses and controlling the phase of the two masses, relative to each other, through use of the conventional type servo control system as is well-known in the seismic vibrator technology. Thus, the respective masses m and m', 10 and 12 respectively, are caused to vibrate along respective axes 14 and 16 about a common central point 18 relative to the horizontal. It can be seen that the acceleration of a single mass 10 (m) on the inclined axis 14 at angle $\theta_2$ is $$f = A \cos(\omega t - e) \tag{1}$$

where e is a phase angle related to the time of passage of the mass 10 (m) through the center point 18 (o), which for the sake of arbitrary definition may be designated as toward the right. The vertical force needed to provide this acceleration acts on the support or positioning carrier vehicle frame and base plate (to be described) with a force $$mf \sin \theta_2 = [Am \cos(\omega t - e)] \sin \theta_2, \tag{2}$$

and the sum of the frame forces for reciprocation of both masses 10 (m) and 12 (m') in the vertical direction will be $$mf \sin \theta_2 + m'f' \sin \theta_1 \tag{3}$$

which can then be equated to $$A[m \sin \theta_2 \cos(\omega t - e) - m' \sin \theta_1 \cos(\omega t - e')]. \tag{4}$$

In like manner, the vector sum of the horizontal forces acting on the frame will be $$A[m \cos \theta_2 \cos(\omega t - e) + m' \cos \theta_1 \cos(\omega t - e)]. \tag{5}$$

There are three special cases that are of primary importance when the masses are axially reciprocated or inclined with $\theta_1$ equal to $\theta_2$ which is equal to $\theta$.

In the first case, e is equal to e' with both masses m and m' proceeding to the right through center point zero at the same instant, axes 14 and 16 not being coplanar. Then, if m is equal to m', the vertical forces will be equal to zero and the horizontal force will be equal to $$2Am \cos \theta \cos(\omega t - e). \tag{6}$$

This mode of operation then renders the vibrator system as a horizontal vibrator producing shear (SH) waves.

In the second case, m is equal to m' and the vibrator is operated with e equal to $e' + \pi$ such that the masses m and m' pass through zero in opposite directions simultaneously. In this case the relationship is $$\cos(\omega t - e) = (\cos \omega t - e' = \pi) = -\cos(\omega t - e'). \tag{7}$$

With the horizontal force equalling 0 and the vertical force equal to $$2Am(\cos \omega t - e') \sin \theta. \tag{8}$$

This makes the system a vertical vibrator.

Finally, in the third case, m still equal to m', but with e equal to $e' + \pi/2$, a relationship exists wherein both P and SH waves are input to the earth through the base plate. In this case, the acceleration relationship is $$\cos(\omega t - e) = \tag{9}$$
$$\cos\left(\omega t - e' - \frac{\pi}{2}\right) = \cos(\omega t - e') \cos \frac{\pi}{2} +$$
$$\sin(\omega t - e') \sin \frac{\pi}{2} = \sin(\omega t - e').$$

Thus, the vertical force may be described as $$A m \sin \theta [\sin(\omega t - e') - \cos(\omega t - e') = \tag{10}$$
$$\sqrt{2} \, A m \sin \theta \left[ \sin\left(\omega t - e' - \frac{\pi}{4}\right) \right],$$

while the horizontal force is described as $$A m \cos \theta \left[ \cos\left(\omega t - e' - \frac{\pi}{2}\right) + \cos(\omega t - e') \right] \tag{11}$$
$$= A m \cos \theta [\sin(\omega t - e') + \cos(\omega t - e')]$$
$$= 2 A m \cos \theta \left[ \cos \tfrac{1}{2}\left(2\omega t - 2e' - \frac{\pi}{2}\right) \cos -\frac{\pi}{4} \right]$$
$$= 2 A m \cos \theta \cos\left(\omega t - e' - \frac{\pi}{4}\right) \frac{1}{\sqrt{2}}$$
$$= \sqrt{2} \, A m \cos \theta \cos\left(\omega t - e' - \frac{\pi}{4}\right),$$

and this makes the system a vertical vibrator with maximum force output $$\sqrt{2} Am \sin \theta \tag{12}$$

and simultaneously a horizontal vibrator with maximum force output $$\sqrt{2} Am \cos \theta. \tag{13}$$

Although the same sweep signal is utilized to drive the dual vibrators, the relative phases of the two vibrators is $\pi/2$ and this must be taken into account during the correlation process. This phase difference is easily accounted for during the correlation stages of signal processing and any necessary phase difference can be set in as required.

FIGS. 2 and 3 illustrate one basic form of dual vibrator assembly that may be utilized in carrying out the present invention. Conventional types of reaction mass hydraulic vibrators 20 and 22 are suitably, and adjustably, mounted on a base plate 24 as carried in conventional manner so that the weight of a carrier vehicle 26 can be applied in coupling the base plate 24 for transmission of the vibrational energy into the earth's surface 28. The base plate 24 may be vehicle center-mounted as described in the aforementioned Bays U.S. Pat. No. 3,306,391 or it may be rear-mounted as in the earlier models of seismic energy vibrator. The reaction mass vibrators 20 and 22 may be such as are fully disclosed in the aforementioned Clynch et al. U.S. Pat. No. 3,159,233 and other related prior teachings which function with a reaction mass reciprocating on a double rod end piston under control of an electrically controlled servo valve, all of which is well known in the art. The carrier vehicle 26 is supported on a plurality of height-adjustable support bars 30 as may be disposed in quadrature array on the four corners of base plate 24.

The first vibrator assembly 20 consists of a reaction mass 32 as reciprocably disposed on a double rod end piston having rod ends 34 and 36. The piston rod end 36 is pivotally attached by means of a bracket 38 to one side of the baseplate 24, and the opposite piston rod end 34 is pivotally affixed to rod 40 of hydraulic cylinder 42 as pivotally attached by means of bracket 44 to the opposite side of baseplate 24. In like manner, the second vibrator assembly 22, including double-rod ends 46 and 48 is adjustably attached with rod end 48 pivotally secured to a baseplate bracket 50 while opposite rod end 46 is pivotally attached to rod 52 of hydraulic cylinder 54 which is further affixed to pivot bracket 56 on baseplate 24. Thus, first and second vibrator assemblies 20 and 22 are identical vibrator assemblies oppositely disposed and pivotally controlled relative to the baseplate 24.

Frequency and sweep rate control of the vibrators 20 and 22 may be affected in well-known manner utilizing a hydraulic supply 58 with controlled fluid application through control valves 60 to the respective servo valves 62 and 64 of vibrators 20 and 22. The servo valves 62 and 64 are then controlled in accordance with the sweep rate signal from sweep control 66 as applied via lines 68 and 70. Suitable phase variation circuitry or phase adjust 72 may be utilized to provide the requisite signal phase difference between the sweep control signals on the respective input lines 68 and 70 to vibrators 20 and 22.

FIG. 4 illustrates an alternative form of combination of vibrator wherein three vibrator assemblies are utilized and the reaction mass weights are distributed to provide better balance relative to the supporting vehicle. Thus, a base plate 24 held down by support rods 30 may carry three vibrator assemblies 80, 82 and 84 each adjustably disposed thereon. However, each of the reaction masses in vibrators 80 and 82 are limited to one-half the weight of vibrator assembly 84 so that balance is achieved while equal mass m and m′ is maintained along the axes of reciprocation. Thus, vibrator 80, having mass m/2, is pivotally connected at rod end 86 as rod end 88 is adjustably positioned by means of a hydraulical cylinder 90; the similar arrangement secures reaction mass 82, having mass m/2, with rod end 92 pivotally affixed to base plate 24 as a hydraulic cylinder 94 adjustably positions the remaining rod end 96; and, the oppositely disposed vibrator 84, of the heavier reaction mass m, would be pivotally affixed at rod end 98 to base plate bracket 100 while hydraulic cylinder 102 supports the opposite rod end 104.

The operation of the alternative vibrator assembly of FIG. 4 would be effected in manner identical to that for the FIG. 2 structure except that the m/2 reaction masses of vibrators 80 and 82 would be operated in synchronous parallel. Here again, in conventional manner, input control signal indicative of the required frequency and sweep rate would be utilized to control the respective servo valves 106 and 108 in synchronism while phase differentiated control would be applied to the heavier mass servo control valve 110.

Figure 5:
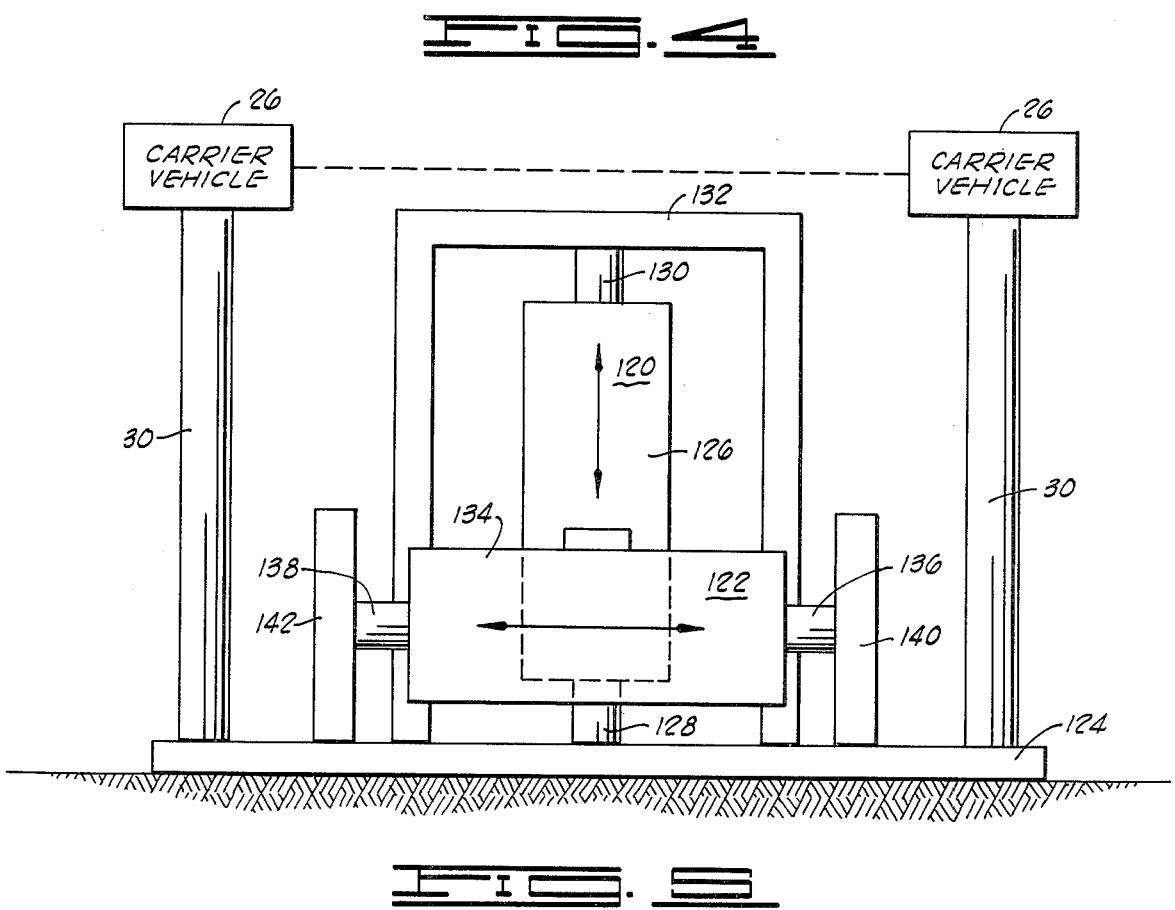
FIG. 5 illustrates in elevation still another alternative form of dual mode vibrator that may be constructed in accordance with this invention.

The vibrator assembly of FIG. 5 illustrates another alternative form of structure which may be utilized for the special case where $\theta_1 = 0$, and $\theta_2 = \pi/2$. This mode of operation does not require variable positioning of the reaction masses such that the vertical or compressional wave vibrator 120 may be disposed in tandem with a shear wave vibrator 122 on an energy coupling base plate 124 as held down by carrier vehicle 26 supported on guide support rods 30. The vertical or compressional wave vibrator 122 may be a conventional form as previously referred to wherein a reaction mass 126 is disposed on a double-rod end piston having ends 128 and 130 rigidly secured to base plate 124 by means of a housing or frame 132. In similar manner, and affixed in tandem juxtaposition, a horizontal or shear wave vibrator 122 is supported with a reaction mass 134 reciprocally disposed on a double-rod end piston having rod ends 136 and 138 as rigidly secured to base plate 124 by respective end frames 140 and 142.

Frequency and sweep rate control of the respective vibrators 120 and 122 may again be effected in conventional manner wherein hydraulic fluid pressure under control of a sweep control signal through suitable servo control valve regulates movement of the respective reaction masses 126 and 134 relative to the respective frame supports and the energy coupling base plate 124.

In operation, the vibrator assembly of the present invention may be utilized in much the same manner as present singular vibration systems of either the compressional or shear wave type. Thus, the base plate 24 is placed in solid engagement with earth surface 28 at a selected shot point location whereupon the carrier vehicle 26 is raised to place hold-down weight via support rods 30 onto base plate 24; as it is shown, for example, in FIG. 2. The hydraulic cylinders 42 and 54 are then adjusted to provide the desired angular position of respective vibrators 20 and 22 relative to base plate 24, and the vibrators can then be operated in unison in conventional manner under control of sweep control 66. Any phase adjustment as between vibrators 20 and 22 may be added by setting of the phase adjust stage 72 as it will provide a desired sweep phase difference as between the respective control leads 70 and 68 to servo valve 64 and 62 of respective vibrators 22 and 20. Such phase adjustment controls variation in relative vibratory positions of the reaction masses of vibrators 20 and 22.

Depending upon the relative phases of vibration of vibrators 20 and 22, both a portion of compressional wave and a portion of shear wave will be coupled into the earth for propagation, reflection and subsequent detection at the earth surface. Detection would take place simultaneously in well-known manner utilizing both vertically and horizontally polarized geophones thereby to provide differentiated pickup of the respective compressional and shear wave energy return. Such return signals would then be correlated in well-known manner, but it must be kept in mind that the relative phases of the two vibrators 20 and 22 must be taken into account during the correlation process so that the respective shear and compressional wave components will be distinctly separated for readout display.

In the operation of the dual vibrator assembly, vibrators 20 and 22 and baseplate 24, a number of wave generation possibilities arise. If the baseplate 24 and vibrators 20 and 22 are arranged to vibrate transversely to the line of survey, i.e. the line between the source position and the selected detector arrays, then the horizontal vibrator motion will give rise to shear SH waves only, and the vertical vibrator motion gives rise to compressional P, shear SV and Rayleigh R waves simultaneously. This is the manner in which horizontal vibrators have been customarily used in the past, i.e. for generation of shear SH waves only.

On the other hand, if the vibrators 20 and 22 and baseplate 24 are arranged to vibrate along the direction of survey, i.e. in line with the detector arrays, either by turning the entire truck at right angles to the survey line or by providing for a rotatable baseplate and vibrator assembly, the following would happen: the vertical vibrator would still generate P, SV and R waves; and, the horizontal vibrator motion would generate a separate SV and, if it were properly phase and scaled with the vertical vibrator, would eliminate or reduce the large elliptical motion associated with the Rayleigh waves generated by the vertical vibrator, this having the overall effect of reducing considerably the near surface interference as seen by the detectors and processing circuitry.

The foregoing discloses a novel seismic vibrator of the type which includes two separately orientable vibrator mechanisms on a single baseplate, and adjustment of either the relative vibrational phases of the vibrators or their physical orientation of vibration axes relative to the baseplate may be controlled to provide selective proportioning of compressional and shear wave input to the earth. Utilization of such a vibrator enables the derivation of information about earth layering as conveyed by both compressional (P) waves and horizontally polarized (SH) shear waves. These distinctly different waves are responsive to different elastic modulii of the earth, and, hence, they tend to complement one another. Simultaneous generation of the shear and compressional waves serves to enable more direct acquisition of a valuable geophysical parameter, i.e. the Poisson's ratio ($\sigma$) (or related $V_p/V_s$), as it is related to rock type and fracturing.

Changes may be made in combination and arrangement of elements as heretofore set forth in the specification and shown in the drawings; it being understood that changes may be made in the embodiments disclosed without departing from the spirit and scope of the invention as defined in the following claims.

What is claimed is:

1. A method for simultaneous inducement of shear and compressional seismic waves into an earth medium, comprising:
   inducing vibration to an earth coupled baseplate along a first axis disposed at a first angle in a plane transverse to the baseplate; and
   simultaneously inducing vibration to said earth coupled baseplate along a second axis disposed at a selected second angle in a plane transverse to the baseplate and parallel to said first mentioned plane and oriented opposite to sid first angle such that both a vertical and horizontal vibration component is coupled into said earth medium.

2. A method as set forth in claim 1 wherein said first angle is equal to said second angle.

3. A method as set forth in claim 2 wherein:
   said first axis vibration and said second axis vibration are in phase relative to transverse movement.

4. A method as set forth in claim 2 wherein:
   said first axis vibration and said second axis vibration are 180° out of phase relative to transverse movement.

5. A method as set forth in claim 2 wherein:
   said first axis vibration and said second axis vibration are 90° out of phase relative to transverse movement.

6. A method as set forth in claim 1 wherein:
   said first axis is perpendicular to said baseplate and said second axis is parallel to said baseplate.

7. A method as set forth in claim 1 which further comprises:
   adjusting the relative phase of the first axis and second axis vibrations to vary the vertical versus horizontal components of vibration energy coupled into said earth medium.

8. Apparatus for generation of shear and compressional seismic waves in an earth medium, comprising:
   baseplate means for coupling vibrational energy into the earth medium;
   first vibrator means secured to said baseplate means to vibrate along an axis disposed at a first angle in a first plane transverse to said baseplate means;
   second vibrator means secured to said baseplate means to vibrate along an axis disposed at a second angle of opposite orientation and disposed in a second plane transverse to said baseplate means wherein said first plane is parallel to said second plane; and
   control means for actuating said first and second vibrator means in preselected phase relationship.

9. Apparatus as set forth in claim 8 which further comprises:
   first hydraulic means for adjustably securing one side of said first vibrator means to said baseplate means such that the first axis angle may be varied; and
   second hydraulic means for adjustably securing the transverse opposite side of said second vibrator means to said baseplate means such that the second axis angle may be varied.

10. Apparatus as set forth in claim 8 wherein:
    said first and second vibrator means are hydraulic vibrators; and
    said control means includes sweep control means providing input to first and second servo valves controlling the respective first and second vibrator means.

11. Apparatus as set forth in claim 10 which further includes:
    phase adjust means interposed to receive input from said sweep control means and generate control signal for input to one of said servo valves.

12. Apparatus as set forth in claim 8 which further includes:
    first frame means secured to said baseplate means to support said first vibrator means with the first angle axis parallel to the baseplate means; and
    second frame means secured to said baseplate means to support said second vibrator means with the second angle axis perpendicular to the baseplate means.

13. Apparatus as set forth in claim 12 wherein:
    said first and second vibrator means are hydraulic vibrators; and
    said control means includes sweep control means providing input to first and second servo valves controlling the respective first and second vibrator means.

14. Apparatus as set forth in claim 13 which further includes:
    phase adjust means interposed to receive input from said sweep control means and generate control signal for input to one of said servo valves.

* * * * *